Patented June 9, 1931

1,808,844

UNITED STATES PATENT OFFICE

FRIEDRICH FRICK, OF UERDINGEN, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PURIFICATION OF WOOL GREASE

No Drawing. Application filed March 27, 1928, Serial No. 265,231, and in Germany April 13, 1927.

This invention comprises improvements in the purification of wool grease. It especially relates to a process of producing bleached wool grease free of water and dirt in one operation from emulsions of wool grease rich in water.

In scouring new wool the recovery of wool grease from waste scouring liquors is frequently made difficult by the tendency of wool grease to form a stable emulsion containing considerable amounts of water and dirt. It is not possible to remove the water therefrom by vaporization; but by heating the emulsion together with neutral salts suitably in a concentrated solution or with dilute acids under conditions of elevated temperature and super-atmospheric pressure, a wool grease poor in or free of water can be obtained, which may be bleached by a further treatment.

According to my invention a bleached wool grease free of water and dirt is produced in one operation from strongly contaminated emulsions by adding instead of a neutral salt or a dilute acid such as sulphuric acid such inorganic salts known as reducing bleaching agents for example sodium bisulfite, hydrosulfite, hydrosulfite-formaldehyde or other similar products, or a dilute sulfurous acid and heating at high temperatures in a pressure-proof vessel whilst stirring the mixture.

My invention is illustrated by the following examples but I wish to be understood that it is not limited to the exact details of the examples; for obvious modifications will occur to person skilled in the art.

*Example 1.*—500 parts by weight of a wool grease emulsion containing 46 percent of water and 19 percent of dirt are mixed with 35 parts by weight of a sodium bisulfite solution containing 5 to 10 parts of sodium bisulfite and heated in an autoclave at 160° C. (pressure rising to about 6 atmospheres), while stirring, until the content of the autoclave after discontinuation of stirring separates into two layers, the upper of which consists of a yellowish bleached wool grease free of water and dirt and may be easily drawn off.

*Example 2.*—500 parts by weight of wool grease (same composition as in the foregoing example) are stirred in an autoclave at 160° C. and at a pressure of about 6 to 7 atmospheres with 100 parts of an aqueous solution of sulfurous acid containing 5 to 7 parts of sulfur dioxide. The content of the autoclave separates when allowed to cool into two layers, the upper one of which consists of the bleached wool grease free of water and dirt and may easily be drawn off, until the resulting bleached wool grease has the same properties as in Example 1.

I claim:

1. A process of preparing pure bleached wool grease free of water and dirt from emulsions of wool grease rich in water which consists in heating the emulsion together with an inorganic reducing bleaching agent under conditions of high temperatures and super-atmospheric pressure.

2. A process of preparing pure bleached wool grease free of water and dirt from emulsions of wool grease rich in water which consists in heating the emulsion together with an inorganic reducing bleaching agent derived from sulfurous acid under conditions of temperatures above 100° C. and super-atmospheric pressure.

3. A process of preparing pure bleached wool grease free of water and dirt from emulsions of wool grease rich in water which consists in heating the emulsion together with sodium bisulfite at about 160° C. and at a pressure of about 6 atmospheres in an autoclave while stirring, until the content of the autoclave, after discontinuation of stirring, separates into two layers.

In testimony whereof I have hereunto set my hand.

FRIEDRICH FRICK.

CERTIFICATE OF CORRECTION.

Patent No. 1,808,844.  Granted June 9, 1931, to

FRIEDRICH FRICK.

It is hereby certified that error appears in the printed specification of the above numbered patent requiring correction as follows: Page 1, line 55, strike out the period and the word "The" and insert , until the, and line 59, for "off, until the " read off. The; and that the said Letters Patent should be read with these corrections therein that the same may conform to the record of the case in the Patent Office.

Signed and sealed this 18th day of August, A. D. 1931.

(Seal)

M. J. Moore,
Acting Commissioner of Patents.